US 6,349,676 B1

(12) United States Patent
Niki et al.

(10) Patent No.: US 6,349,676 B1
(45) Date of Patent: Feb. 26, 2002

(54) SMALL ANIMAL REARING APPARATUS

(76) Inventors: Motohiro Niki, 22-11, Yushima 2-Chome, Bunkyo-Ku, Tokyo-To; Atsushi Kidachi, 7-5, Ojidai 1-Chome, Sakura-Shi, Chiba-Ken; Mieko Niki; Etuko Niki, both of 22-11, Yushima 2-Chome, Bunkyo-Ku, Tokyo-To; Misako Kidachi, 7-5, Ojidai 1-Chome, Sakura-Shi, Chiba-Ken, all of (JP)

( * ) Notice: Subject to any disclaimer, the term of this patent is extended or adjusted under 35 U.S.C. 154(b) by 0 days.

(21) Appl. No.: 09/451,178

(22) Filed: Nov. 30, 1999

(30) Foreign Application Priority Data

Jan. 13, 1999 (JP) .......................................... 11-006878

(51) Int. Cl.⁷ ............................. A01K 1/03; A01K 31/06
(52) U.S. Cl. ........................................ 119/452; 119/458
(58) Field of Search ........................ 119/450, 452, 119/454, 455, 456, 458

(56) References Cited

U.S. PATENT DOCUMENTS 3,783,829 A * 1/1974 Siciliano ..................... 119/455
3,822,673 A * 7/1974 Benny ......................... 119/458
3,828,732 A * 8/1974 Hill et al. .................... 119/458
3,896,768 A * 7/1975 Galloway .................... 119/458
3,978,819 A * 9/1976 Lovitt ......................... 119/458

* cited by examiner

Primary Examiner—Charles T. Jordan
Assistant Examiner—Elizabeth Shaw
(74) Attorney, Agent, or Firm—Ladas & Parry (57) ABSTRACT

A small animal rearing apparatus (1) has a frame (2) of a rectangular shape, a rearing unit having a plurality of rearing sections (4) formed in vertical arrangement and provided respectively with floor boards (15) sloping down toward the front. Spray nozzles (18) are disposed respectively above the high rear ends of the floor boards (15) to spray washing water from the high rear ends of the floor boards (15) toward the low front ends of the same along the upper surfaces of the same, respectively. The high rear end of the floor board (15) of each rearing division (4) underlying the spray nozzle (18) does not have any raised part. The spray nozzle (18) can be disposed with its axis extended substantially in parallel to the upper surface of the floor board (15). A downward rear rim (15a) is formed by bending downward a rear edge portion of each floor board (15). The floor board (15) can be detachably supported and held in place on beams (20, 21) of a floor board support frame with the downward rear rim (15a) engaged with the rear longitudinal beam (20).

7 Claims, 7 Drawing Sheets

SMALL ANIMAL REARING APPARATUS

BACKGROUND OF THE INVENTION

The present invention relates to a small animal rearing apparatus provided with a washing system and used for rearing small experimental animals, such as rats or mice. More particularly, the present invention relates to improvements in the floor boards of rearing sections, and a washing system provided with washing nozzles.

DESCRIPTION OF THE RELATED ART

Figure 5:
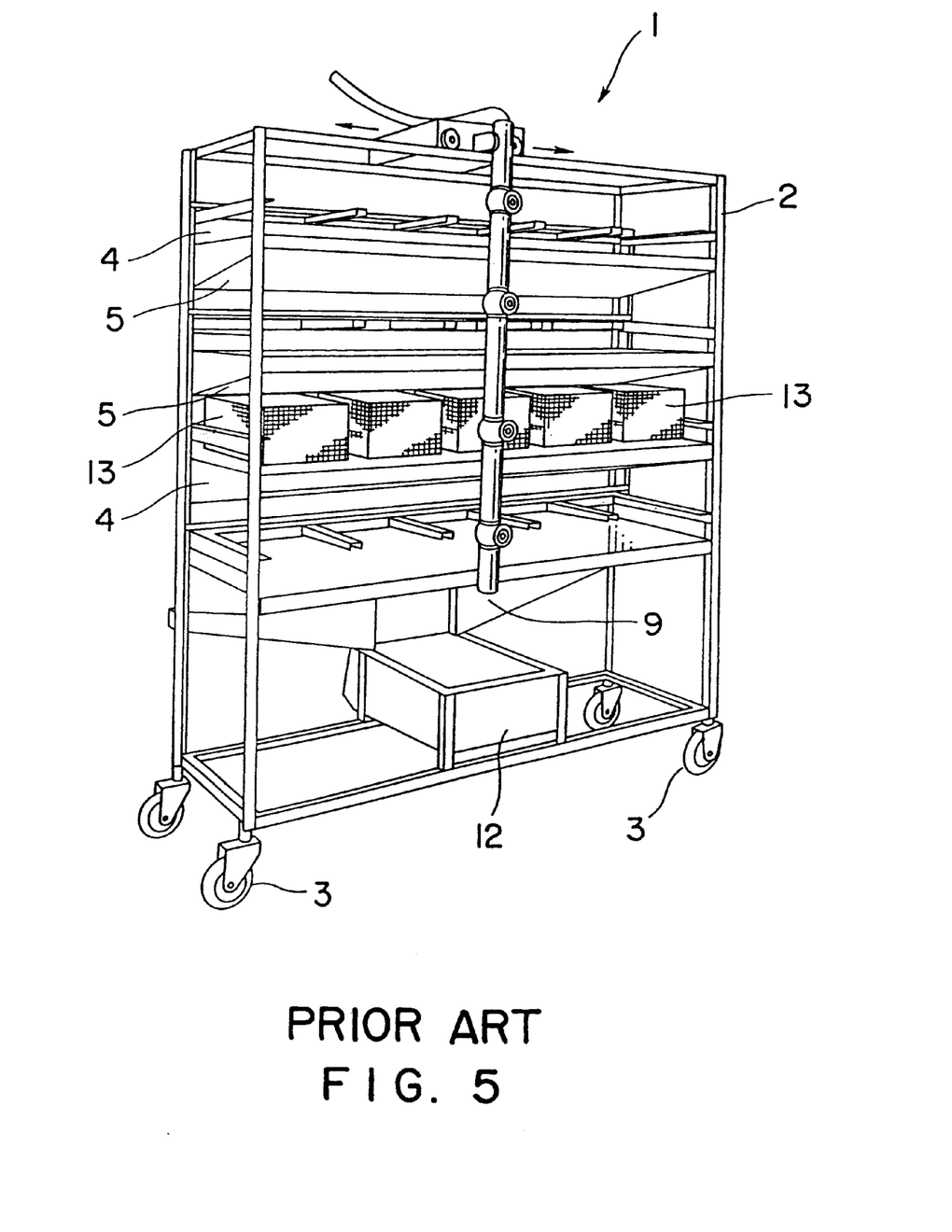
FIG. 5 is a perspective view of a prior art small animal rearing apparatus.
Figure 6:
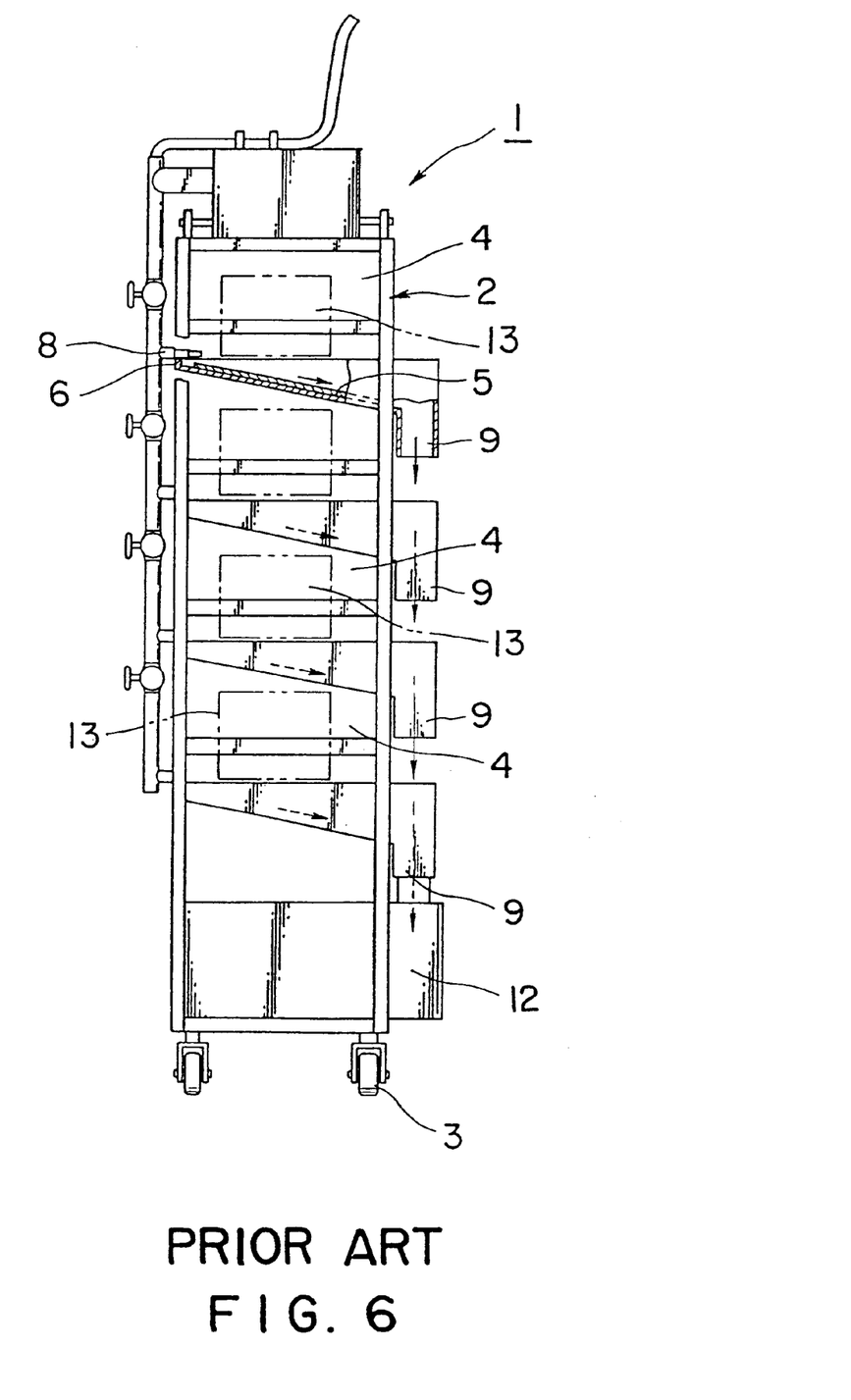
FIG. 6 is a side elevation of the small animal rearing apparatus shown in FIG. 5.
Figure 7:
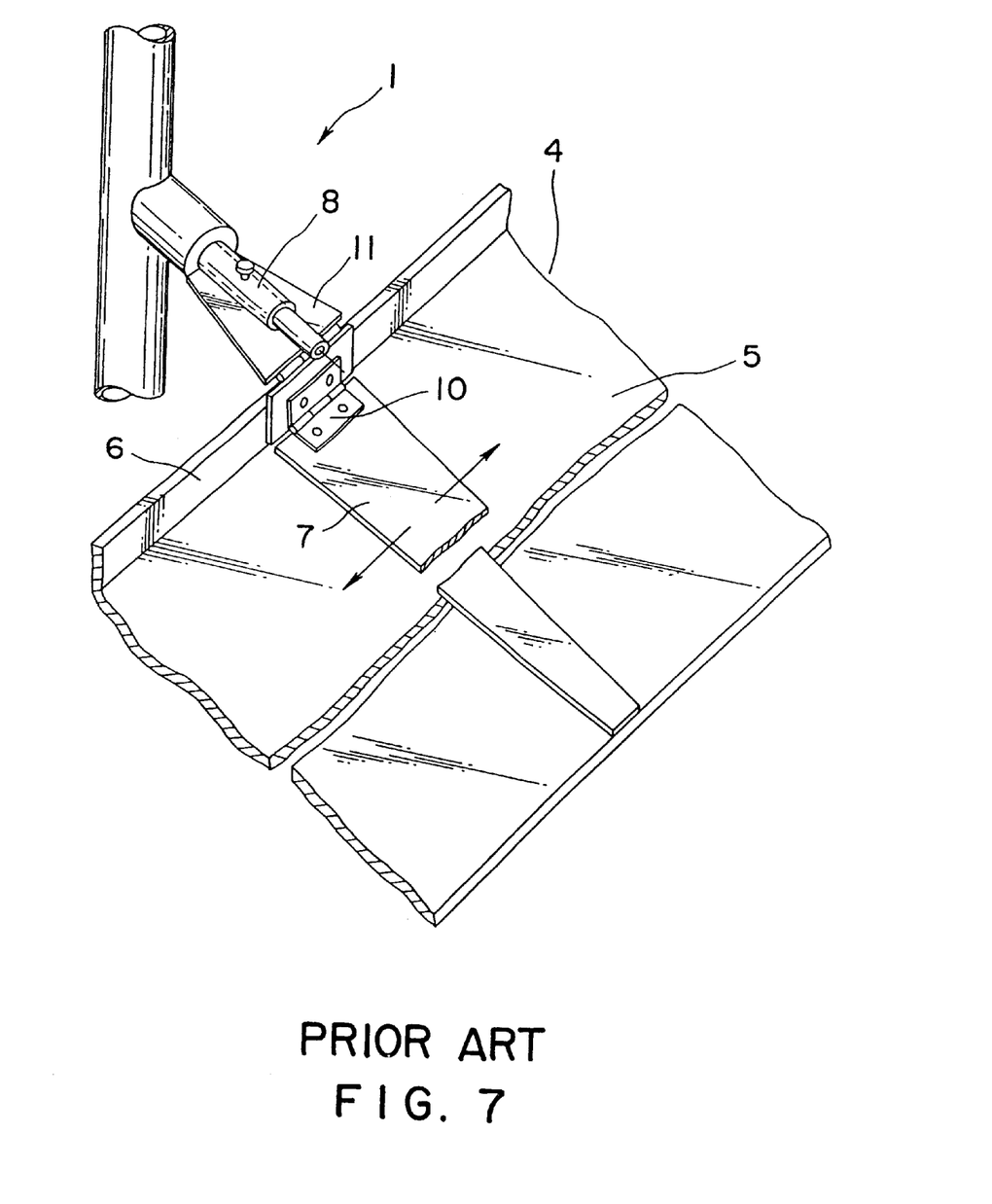
FIG. 7 is a fragmentary, partly sectional perspective view of a floor board and a spray nozzle included in the prior art small animal rearing apparatus shown in FIG. 5.

FIGS. 5 and 6 show a small animal rearing apparatus 1 for rearing small experimental animals, such as rats or mice, disclosed in JP-B-61-59083. This small animal rearing apparatus 1 has a frame 2 of a rectangular shape formed by assembling angle bars. Casters 3 are attached to the lower end of the frame 2. A space defined by the frame 2 is divided into a plurality of vertically arranged rearing sections 4 by angle bars. Floor boards 5 are fixedly supported on the frame 2 for defining the rearing sections 4, respectively. The floor boards 5 are sloped down toward the front (toward the right as viewed in FIG. 6) to facilitate cleaning the rearing sections 4. A rear edge portion (a left edge portion as viewed in FIG. 6) of each floor board 5 is bent up to form a raised rim 6 as shown in FIG. 7. A scraper plate 7 for scraping dirt, such as small animals' excrements, off the floor board 5, and a spray nozzle 8 for spraying washing water are supported for movement along the raised rim 6 of each floor board 5. The scraper plates 7 and the spray nozzle 8 are moved along the raised rims 6 of the floor boards 5 in directions along the length of the frame 2 (longitudinal directions). A proximal end part of each scraper plate 7 is joined to a support member 11 supporting the spray nozzle 8 by a hinge 10. Dirt scraped off the floor boards 5 by the scraper plates 7 and washing water sprayed by the spray nozzles 8 flow through drain pipes 9 into a sump 12 or into a sewer. A plurality of rearing cases 13 accommodating small animals are placed in longitudinal arrangement in each rearing section 4.

Figure 8:
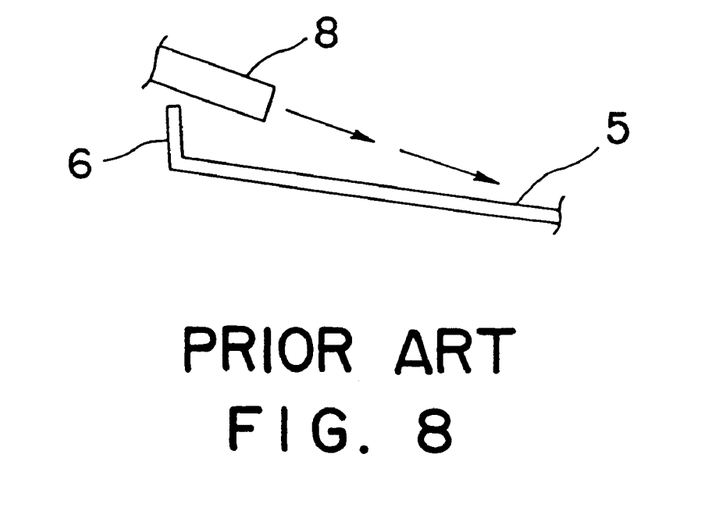
FIG. 8 is a schematic side elevation for explaining the positional relation between a spray nozzle and a floor board in the prior art small animal rearing apparatus shown in FIG. 5.
Figure 9:
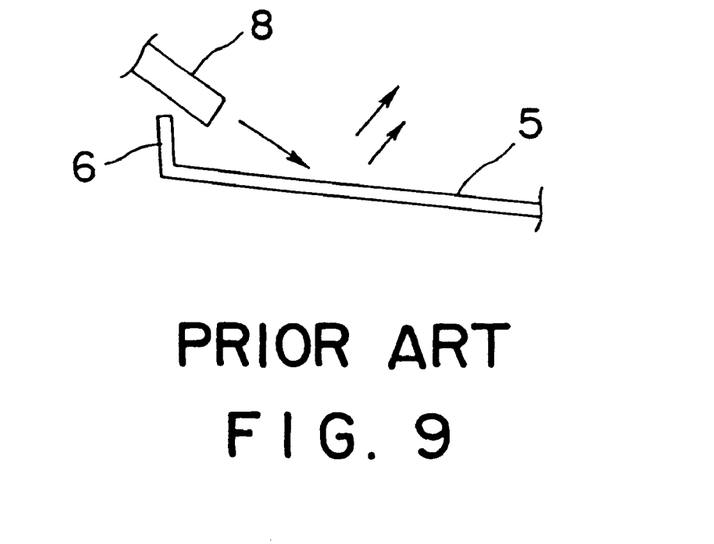
FIG. 9 is a schematic side elevation for explaining a problem in the prior art small animal rearing apparatus shown in FIG. 5.

The floor board 5 of the rearing section 4 has the raised rim 6 on the side of the spray nozzle 8 and the spray nozzle 8 is disposed above the raised rim 6, and hence washing water is sprayed in a direction inclined at an angle to the upper surface of the floor board 5. Since the floor board 5 has the raised rim 6, the spray nozzle 8 and the scraper plate 7 are on different levels, respectively, and the scraper plate 7 needs to be connected to the nozzle 8 by the hinge 10. Consequently, washing water cannot be sprayed on a rear region of the upper surface of the floor board 5 near the raised rim 6 as shown in FIG. 8 and the rear region of the upper surface of the floor board 5 cannot be washed. In some cases, wash water is splashed on the small animals by the scraper plates 7 and the floor boards 5 as shown in FIG. 9. Since the spray nozzle 8 has the shape of a straight pipe and is disposed above the raised rim 6, the rear region of the upper surface of the floor board 5 is in the dead space of the spray nozzle 8, and dirt adhering to the rear region cannot satisfactorily be washed away. The hinge 10 is liable to break and obstruct cleaning operation. The scraper plate 7 needs to be formed in a relatively great width to enable the scraper plate 7 to slide smoothly along the upper surface of the floor board 5. However, the wide scraper plate 7 sometimes sticks to the floor board 5 and becomes immovable if a film of water is formed between the scraper plate 7 and the upper surface of the floor board 5.

Since the floor boards 5 are fixedly supported on the frame 2, the rearing apparatus 1 cannot be easily assembled and work to remove the floor boards 5 from the frame 2 for maintenance and thorough cleaning takes much time. Since the floor boards 5 are mounted on stainless steel plates, spaces between the floor board 5 and the stainless steel plates provide suitable nests of insects. Since those spaces are poorly ventilated and the animal rearing room is kept at temperatures around 22° C., bacteria and mold are liable to propagate therein. Moreover, it is difficult to warp the floor boards 5 so as to conform to the shapes of the scraper plates 7 when the scraper plates 7 are moved along the upper surface of the floor boards 5 because the floor boards 5 are mounted on the stainless steel plate.

The present invention has been made to solve those problems in the conventional small animal rearing apparatus and it is therefore an object of the present invention to provide a small animal rearing apparatus provided with floor boards capable of being satisfactorily washed and maintained and of easily warping so as to conform to t he shape of scraper plates.

SUMMARY OF THE INVENTION

According to the present invention, a small animal rearing apparatus comprises a frame of a rectangular shape, a rearing unit having a plurality of rearing sections formed in vertical arrangement and provided respectively with floor boards sloping downward toward the front, and spray nozzles disposed respectively on the levels of the floor boards to spray washing water from higher rear ends of the floor boards toward lower front ends of the floor boards along the upper surfaces of the floor boards, respectively, in which the higher rear end of the floor board of each rearing section underlying the spray nozzle is free from any raised part.

Preferably, the floor boards of the rearing sections are detachably attached to floor board support frames supported on the frame. Each floor board has a downward rear rim formed by bending a rear edge portion thereof downward, and the floor board is held in place on the floor board support frame with the downward rear rim thereof engaged with a member of the floor board support frame. Preferably, each spray nozzle has a bellows-shaped body.

The above and other objects, features and advantages of the present invention will become more apparent from the following description taken in connection with the accompanying drawings.

DESCRIPTION OF THE PREFERRED EMBODIMENTS

A small animal rearing apparatus in a preferred embodiment of the present invention will be described with reference to FIGS. 1 to 4, in which description of parts like or corresponding to those shown in and previously described with reference to FIGS. 5 to 9 will be omitted.

Figure 1:
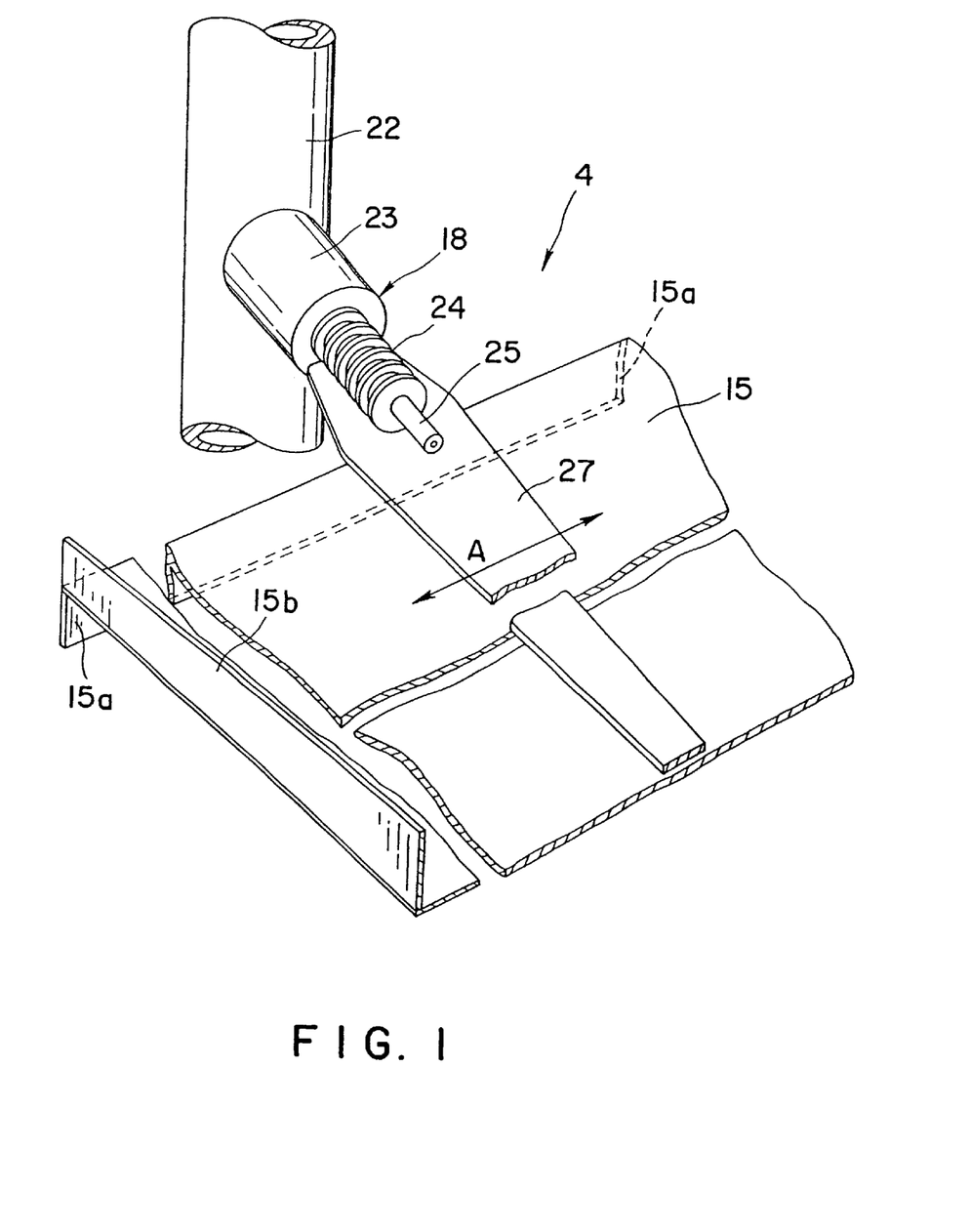
FIG. 1 is a fragmentary, partly sectional perspective view of a small animal rearing apparatus in a preferred embodiment of the present invention.
Figure 2:
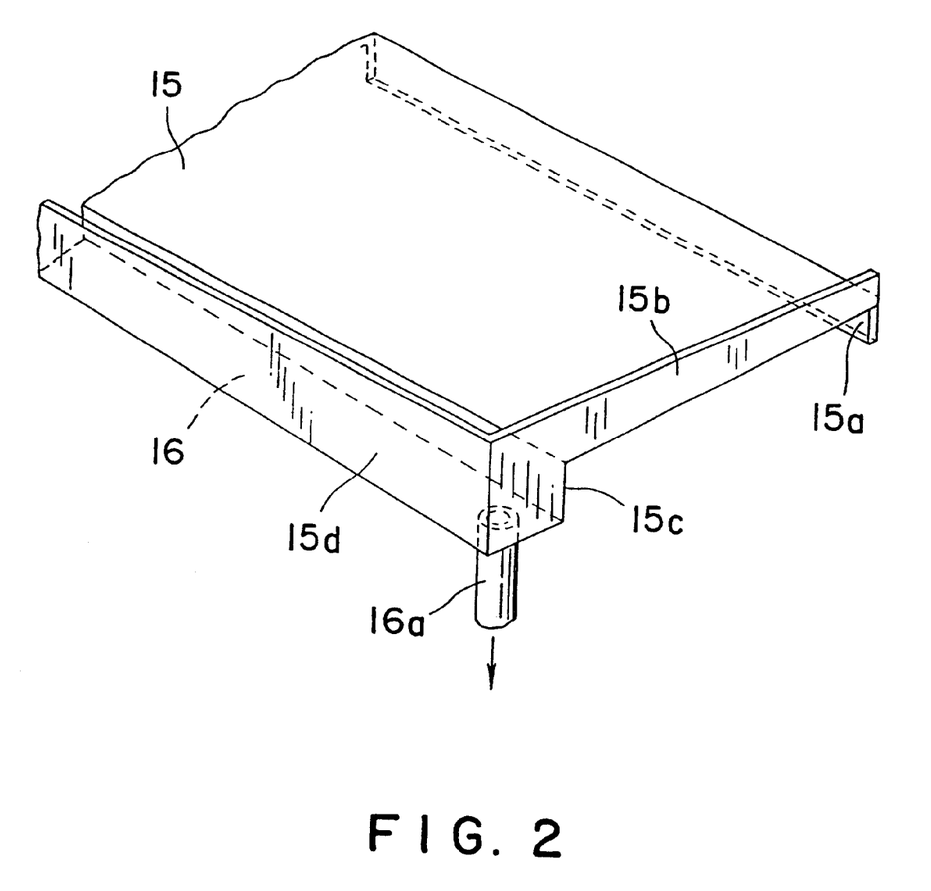
FIG. 2 is a fragmentary perspective view of a floor board of a rearing section.
Figures 3, 4:
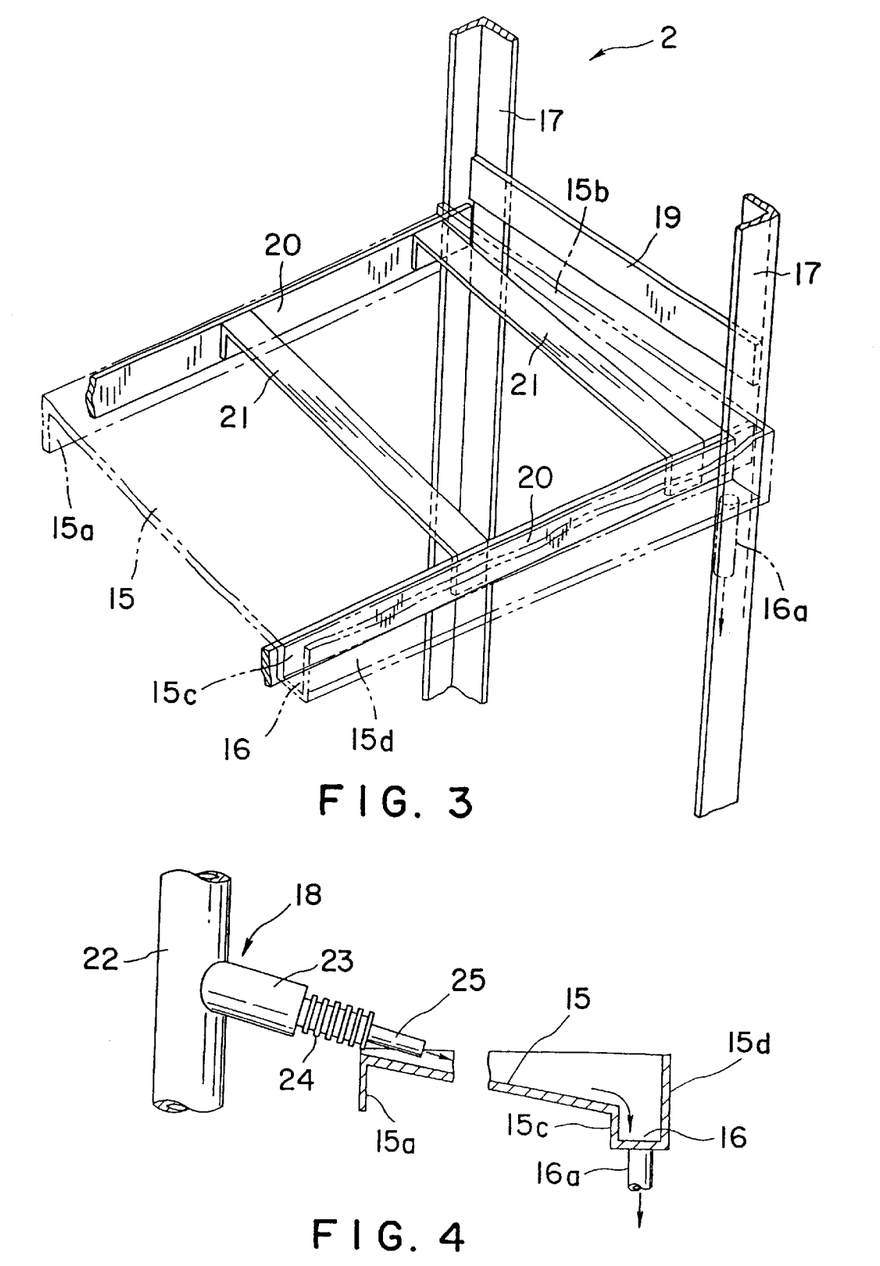
FIG. 3 is a perspective view of a floor board support structure of a frame.
FIG. 4 is a side view of a spray nozzle and a floor board.

Referring to FIG. 1, a rearing section 4 is provided with a rectangular floor board 15 of a metal or a plastic material. The floor board 15 has a downwardly extending rear rim 15a formed by bending a rear edge portion thereof downward. The floor board 15 does not have any raised rim corresponding to the raised rim 6 of the floor board 5 shown in FIG. 7. Longitudinally opposite edge portions of the floor board 15 are bent upward to form standing end rims 15b. As shown in FIGS. 2 and 4, a trough 16 having a downward front wall 15c, a standing front wall 15d and a bottom wall is formed by bending a front edge portion of the floor board 15. The bottom wall of the trough 16 is sloped down toward one end thereof. The opposite longitudinal ends of the trough 16 is closed by the standing end rims 15b. A drain pipe 16a is connected to the lowest portion of the bottom wall of the trough 16. Washing water and dirt scraped off the floor board 15 flow into the trough 16 and are drained through the drain pipe 16a.

As shown in FIG. 3, the frame 2 has two pairs of posts 17 at the corners of its opposite longitudinal ends. Cross bars 19 are extended between the pairs of posts 17, respectively. Longitudinal beams 20 are extended between the longitudinally opposite posts 17. The level of the rear longitudinal beam 20 is higher than that of the front longitudinal beam 20. Cross beams 21 are extended between the longitudinal beams 20 so as to slope down toward the front longitudinal beam 20 and are arranged longitudinally at intervals. The longitudinal beams 20 and the cross beams 21 at the opposite ends of the longitudinal beams 20 form a rectangular support frame for supporting the floor board 15.

As indicated by imaginary lines in FIG. 3, the floor board 15 is put on the floor board support frame having the longitudinal beams 20 and the cross beams 21. Then, the floor board 15 is positioned on the floor board support frame with the downward rear rim 15a in contact with the rear side surface of the rear longitudinal beam 20, and the downward front wall 15c in contact with the front side surface of the front longitudinal beam 20. Thus, the floor board 15 is supported on the frame 2 with the upper surface thereof sloping toward the front. Since the floor board 15 is thus simply mounted on the longitudinal beams 20, the floor board 15 can be easily put on and removed from the frame 2 and can be held stationary. The inclined, flat portion of the floorboard 15 is supported on the crossbeams 21. The floor board 15 need not necessarily be supported detachably on the frame 2 in the foregoing manner; the floor board 15 may be held on the frame 2 by the engagement of any suitable joining means formed on the floor board 15 and any suitable joining means formed on the frame 2 and capable of being engaged with the joining means of the floor board 15.

Referring again to FIG. 1, a spray nozzle 18 for spraying washing water has a short pipe 23 projecting horizontally from a vertical water supply pipe 22, a bellows 24 of a plastic material, rubber or a metal connected to the short pipe 23, and a nozzle 25 attached to the front end of the bellows 24. A scraper plate 27 is attached directly to the short pipe 23. In the prior art small animal rearing apparatus shown in FIG. 7, the proximal end part of the scraper plate 7 is connected to the hinge 10 connected to the support member 11 supporting the spray nozzle 8. Since the floor board 15 does not have any longitudinal raised rim corresponding to the raised rim 6 of the floor board 5 of the prior art small animal rearing apparatus, the scraper plate 27 can be directly attached to the short pipe 23. Since the width of the scraper plate 27 may be on the order of 10 mm, the scraper plate 27 scarcely sticks to the floor board 15.

Since the floor board 15 does not have any part corresponding to the raised rim 6 shown in FIG. 7 below the spray nozzle 18, the spray nozzle 18 can be disposed with its axis substantially parallel to the upper surface of the floor board 15. Therefore, the spray nozzle 18 is able to spray washing water in a direction parallel to the upper surface of the floor board 15 and, consequently, the washing water can flow along the upper surface of the floor board 15 over the entire upper surface of the floor board without being splashed. Accordingly, a sufficient amount of washing water can be sprayed at a sufficiently high pressure along the upper surface of the floor board 15. Since the floor board 15 is held in place on the frame simply with the downward rear rim 15a and the downward front wall 15c thereof in contact with the rear and front longitudinal beams 20, respectively, the floor board 15 can be easily removed from the frame 2 to clean the floor board support frame. Since the space under the floor board 15 is well ventilated, it is difficult for bacteria and mold to propagate in the space under the floor board 15. Since the floor board 15 is simply placed on the floor board support frame, the floor board 15 is able to warp easily so as to conform to the shape of the scraper plate 27.

Since the bellows 24 of the spray nozzle 18 is flexible, an optional direction in which the spray nozzle 18 sprays washing water can be selectively determined. The inclination of the axis of the spray nozzle 18 to the upper surface of the floor board 15 is 10° at the maximum and, preferably, in the range of 5° to 6°. The tip of the spray nozzle 18 is at a height of 10 mm at the maximum, preferably, at a height in the range of 5 to 6 mm from the upper surface of the floor board 15.

The scraper plate 27 is reciprocated in the directions of the arrows A shown in FIG. 1 along the upper surface of the floor board 15 to scrape dirt off the floor board 15 to assist forcing the dirt into the trough 16 by washing water sprayed by the spray nozzle 18. The dirt flows through the trough 16 and is drained through the drain pipe 16a.

As is apparent from the foregoing description, the small animal rearing apparatus according to the present invention has a plurality of rearing sections formed in vertical arrangement and having the floor boards each not having any raised rim below the spray nozzle. Therefore, the spray nozzle can be disposed with its axis substantially in parallel to the upper surface of the corresponding floor board to spray washing water over the substantially entire region of the upper surface of the floor board including a region near the spray nozzle to clean the entire upper surface of the floor board.

Since the floor board is simply and detachably put on the frame, the floor board can be easily removed for cleaning from the frame. The downward rear rim 15a of the floor board facilitates putting the floor board on the frame and surely holds the floor board in place on the frame.

Since the spray nozzle has the bellows, the spraying direction of the spray nozzle can be easily and properly adjusted relative to the upper surface of the floor board and, consequently, the floor board can be satisfactorily washed by spraying washing water by the spray nozzle without splashing washing water on the small animals accommodated in the rearing cages.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A small animal rearing apparatus comprising:

a support frame of a rectangular shape;

a rearing unit having a plurality of rearing sections formed in vertical arrangement and provided respectively with floor boards sloping down toward a front side of the apparatus; and spray nozzles disposed respectively on levels of the floor boards to spray washing water from a higher rear end of the floor boards toward a lower front end of the floor boards along upper surfaces of the floor boards respectively;

wherein the higher rear end of the floor board of each rearing section underlying the spray nozzle is free from any raised part; and each floor board has a downward rear rim formed by bending a rear edge portion thereof downward, and each floor board is held in place on the floor board support frame with the downward rear rim engaged with a member of the floor board support frame.

2. A small animal rearing apparatus comprising:

a support frame of a rectangular shape;

a rearing unit having a plurality of rearing sections formed in a vertical arrangement, each of said rearing sections having a front side, a rear side opposite to said front side, and two opposite ends, each of said rearing sections being provided with a floor board sloping down from one of said sides to the other side so that the floor board has a higher side and a lower side; and a spray nozzle disposed adjacent to said higher side of each floor board and being movable along the higher side between said two opposite ends of each rearing section, said spray nozzle having a spray pipe extending in a direction from said higher side to said lower side and being oriented to spray washing water from the higher side toward the lower side and along an upper surface of said floor board as the spray nozzle is moved along said higher side;

wherein the higher side of the floor board along which the spray nozzle is moved is free from any raised part, so that the spray nozzle is positioned close to the upper surface of the floor board with an axis of the spray nozzle disposed substantially in parallel to said upper surface.

3. The small animal rearing apparatus according to claim 2, wherein said spray nozzle has a bellows supporting said spray pipe for allowing directional adjustment of the spray pipe.

4. The small animal rearing apparatus according to claim 2, further comprising a scraper plate attached to said spray nozzle and extending from said higher side to the lower side of the floor board to move with the spray nozzle to scrape dirt off the floor board as the spray nozzle is moved along the floor board.

5. The small animal rearing apparatus according to claim 2, wherein each floor board is detachable from the support frame.

6. The small animal rearing apparatus according to claim 5, wherein each floor board has a downward rim bent downward along an edge of the higher side of the floor board and each floor board is held in place on the support frame with the downward rear rim engaged with a member of the support frame.

7. The small animal rearing apparatus according to claim 2, wherein said floor board is formed with a trough along the lower side thereof to collect used washing water.

\* \* \* \* \*